(12) United States Patent
Chandran et al.

(10) Patent No.: US 6,958,136 B2
(45) Date of Patent: Oct. 25, 2005

(54) PROCESS FOR THE TREATMENT OF WASTE STREAMS

(75) Inventors: Ravi Chandran, Ellicott City, MD (US); Momtaz N. Mansour, Highland, MD (US)

(73) Assignee: Manufacturing and Technology Conversion International, Inc., Baltimore, MD (US)

( * ) Notice: Subject to any disclaimer, the term of this patent is extended or adjusted under 35 U.S.C. 154(b) by 0 days.

(21) Appl. No.: 10/828,834

(22) Filed: Apr. 21, 2004

(65) Prior Publication Data
US 2004/0265202 A1 Dec. 30, 2004

Related U.S. Application Data (60) Provisional application No. 60/539,951, filed on Jan. 29, 2004, and provisional application No. 60/464,240, filed on Apr. 21, 2003.

(51) Int. Cl.$^7$ .......................... C01B 21/00; C01B 17/00; B01J 8/00
(52) U.S. Cl. ................. 423/235; 423/239.1; 423/242.1; 423/242.2
(58) Field of Search ............................ 423/235, 239.1, 423/242.1, 242.2

(56) References Cited

U.S. PATENT DOCUMENTS

| | | |
|---|---|---|
| 5,059,404 A | 10/1991 | Mansour et al. |
| 5,133,297 A | 7/1992 | Mansour |
| 5,197,399 A | 3/1993 | Mansour |
| 5,205,728 A | 4/1993 | Mansour |
| 5,211,704 A | 5/1993 | Mansour |
| 5,255,634 A | 10/1993 | Mansour |
| 5,306,481 A | 4/1994 | Mansour et al. |
| 5,353,721 A | 10/1994 | Mansour et al. |
| 5,366,371 A | 11/1994 | Mansour et al. |
| 5,536,488 A | 7/1996 | Mansour et al. |
| 5,637,192 A | 6/1997 | Mansour et al. |
| 5,638,609 A | 6/1997 | Chandran et al. |
| 5,747,410 A * | 5/1998 | Muramatsu et al. ........ 502/348 |
| 5,842,289 A | 12/1998 | Chandran et al. |
| 5,918,582 A * | 7/1999 | Itoyama et al. ........ 123/568.29 |
| 6,149,765 A | 11/2000 | Mansour et al. |
| 6,280,694 B1 * | 8/2001 | Mason .................. 423/239.1 |
| 6,548,197 B1 | 4/2003 | Chandran et al. |
| 6,813,882 B2 * | 11/2004 | Hepburn et al. ............. 60/286 |
| 2004/0031450 A1 | 2/2004 | Chandran et al. |
| 2004/0079087 A1 | 4/2004 | Chandran et al. |

\* cited by examiner

*Primary Examiner*—Stanley S. Silverman
*Assistant Examiner*—Jonas N. Strickland
(74) *Attorney, Agent, or Firm*—Dority & Manning, P.A.

(57) ABSTRACT

The present invention is directed to a process for treating, reducing, and/or stabilizing various wastes or flue gases. In one embodiment, the process is directed to treatment of alkali bearing wastes that include nitrate and/or nitrite-rich wastes. Optionally, the disclosed method can be utilized for treatment of hazardous wastes, including radioactive hazardous waste compounds. In general, the present invention includes processing a waste or gaseous stream with the addition of suitable carbon-containing additives to treat and reduce nitrogen-containing compounds in the waste. Additives may be gaseous, liquid or solid reduction-promoting agents, catalysts, and the like. The reaction products obtained from the process of the invention include mainly alkali carbonate, nitrogen, hydrogen, carbon monoxide and carbon dioxide.

26 Claims, 4 Drawing Sheets

PROCESS FOR THE TREATMENT OF WASTE STREAMS

CROSS REFERENCE TO RELATED APPLICATION

This application claims benefit to U.S. Provisional Applications having Ser. No. 60/464,240 filed Apr. 21, 2003 and Ser. No. 60/539,951 filed Jan. 29, 2004.

BACKGROUND OF THE INVENTION

In the past, in denitrification of metal nitrates, aluminum nitrate has been added to waste solutions containing nitric acid and metal nitrates, such as sodium nitrate and radioactive salts, for example. In particular, waste solutions containing sodium nitrate have been mixed with aluminum nitrate in a direct kerosene fired bed calciner at about 500° C. In this process, the sodium nitrate and aluminum nitrate are converted to sodium aluminate and nitrogen oxides (commonly referred to as $NO_x$, e.g., $NO$, $NO_2$, and $N_2O_3$) according to the following formula:

$$NaNO_3 + Al(NO_3)_3 \rightarrow NaAlO_2 + 4NO_x$$

Unfortunately, the above process requires a substantial amount of aluminum nitrate and is only about 70 percent effective in denitrifying the metal nitrates. Further, the nitrogen oxides that are produced during the reaction are wet-scrubbed, generating more nitrite/nitrate solution than the process began with. Also, problems of agglomeration have been experienced in the calciner due to melting in the bed. As such, a new process that requires less additive, is more efficient, more effective, less costly and more operationally available is needed in treating waste streams, and particular in treating waste streams including nitrogen-containing compounds such as nitrates, nitrites, and $NO_x$ compounds.

SUMMARY OF THE INVENTION

According to one embodiment of the present invention, a waste or gaseous stream comprising nitrogen-containing compounds can be treated by a method including decomposing a carbon-containing additive to form a carbon-containing radical and reducing the nitrogen-containing compounds via reaction with the carbon-containing radical and forming a product stream, the product stream including the reduction products that can include, in various embodiments, nitrogen gas, carbon monoxide and/or carbon dioxide, and carbonate salts. The process can also include feeding the waste stream to a reactor, heating the reactor to a reaction temperature, and feeding the carbon-containing additive to the reactor, where it can decompose to form the carbon-containing radicals.

For instance, the nitrogen-containing compounds can be nitrates and/or nitrites, e.g., metal nitrates and/or metal nitrites. In one particular embodiment, the compounds can be alkali metal nitrates and/or alkali metal nitrites, for instance sodium or potassium nitrates and/or nitrites. In one embodiment, the nitrogen-containing compounds can be one or more nitrogen oxide compounds. The nitrogen oxide compounds can be the product of, for instance, a combustion process or a gasification process. In one embodiment, the waste stream can include hazardous wastes including, for example, radioactive materials. If desired and in particular when the method is utilized in treating hazardous wastes, the reactor can be operated at negative gauge pressure.

In one embodiment, the reactor can be a fluidized bed reactor that can be fluidized with, for example, steam, superheated steam, $CO_2$, or combinations thereof. For example, the reactor can be a reformer. Optionally, a gas or vapor additive can be added to the process in line with the fluidizing stream.

In some embodiments, the reactor can be indirectly heated. The reactor can, in one embodiment, be heated to a reaction temperature of less than about 1,400° F. In another embodiment, the reactor can be heated to a temperature between about 600° F. and about 2,000° F.

The carbon-containing additive can be a liquid, a solid, or a gas additive. For example, the carbon-containing additive can be, in one embodiment, isopropyl alcohol that can be optionally fed to the reactor in line with a liquid waste stream. In another embodiment, the carbon-containing additive can be polypropylene.

The disclosed method can treat other materials in the waste or gaseous stream in addition to the nitrogen-containing compounds. For example, in one embodiment, the process can be utilized for the reduction of sulfur-containing compounds in the stream.

BRIEF DESCRIPTION OF THE FIGURES

A full and enabling disclosure of the present invention, including the best mode thereof to one of ordinary skill in the art, is set forth more particularly in the remainder of the specification, including reference to the accompanying figures in which.

Repeat use of reference characters in the present specification and drawings is intended to represent the same or analogous features or elements of the present invention.

DETAILED DESCRIPTION OF PREFERRED EMBODIMENTS

Reference will now be made in detail to various embodiments of the invention. Each embodiment is provided by way of explanation of the invention, not limitation of the invention. In fact, it will be apparent to those skilled in the art that modifications and variations can be made in the invention without departing from the teaching and scope thereof, for instance, features illustrated or described as part of one embodiment to yield a still further embodiment derived from the teaching of the invention. Thus, it is intended that the invention cover such derivative modifications and variations to come within the scope of the invention embodiments described herein and their equivalents.

The invention disclosed herein generally relates to a process for treating waste or gaseous streams. In particular, the disclosed invention is directed to a process for treating waste or gaseous streams that include one or more of a variety of nitrogen-containing compounds such as nitrates, nitrites, and/or $NO_x$ compounds.

In one particular embodiment, the process of the present invention can be used for treating hazardous wastes that include radionuclides. Other types of wastes can also be treated according to the inventive process, however. For example, other types of hazardous waste can be treated. In general, any type of nitrogen-containing waste, which can be advantageously treated through a reduction process as herein disclosed, is encompassed by the present disclosure. For instance, the invention is directed in one embodiment to an improved process and apparatus for reduction of alkali and/or metal compounds in a waste stream for example, sodium and/or potassium nitrogen-containing compounds. For example, the treatment process can be utilized for denitrifying metal nitrates in a waste stream. The invention is also directed to an apparatus for carrying out the disclosed treatment processes.

In general terms, the process of the invention is directed to a process for treating, reducing, and/or stabilizing a wide variety of nitrogen-containing wastes. In one embodiment, the process of the invention is particularly well suited to alkali bearing wastes, for example the present process can treat waste streams including alkali sulfur and chlorine compounds in addition to nitrate and/or nitrite waste compounds.

It is an objective of the present invention to introduce a new and innovative process for treating a waste stream that can obtain a number of beneficial results including:

Promote the reduction of nitrates and nitrites in a waste stream;

Minimize the formation of nitrogen oxides ($NO_x$) in the reduction process;

Minimize the volatilization of certain radioactive species and heavy metals which may be included in the waste stream;

Minimize and preferably eliminate the potential for bed agglomeration;

Promote the reduction of chlorides, phosphates, sulfites, and sulfates in a waste stream;

Promote the stabilization of any radioactive species and/or heavy metals;

Maximize carbon conversion;

Minimize formation of tar and condensable hydrocarbons;

Minimize the potential for the formation of dioxins and furans;

Minimize fines generation and minimize fines emissions;

Maximize waste volume reduction;

Affect maximum retention of radionuclides in the solid residue;

Minimize off-gas treatment and secondary waste generation;

Maximize the potential for employing vitrification or safe storage of solid residue from the waste;

Provide a process throughput consistent with heat input capability of the unit; and Provide off-gas that achieves compliance with emissions standards.

In one embodiment, the present invention includes reacting a waste stream with suitable additives to treat and reduce a variety of different nitrogen-containing waste components. In particular, the waste or gaseous stream can include nitrates, nitrites, and/or $NO_x$ compounds.

One particular embodiment of the disclosed process is directed to treating a waste stream in a fluidized bed thermochemical reactor. A fluidized bed reactor has been found to be beneficial to certain embodiments of the disclosed process for a variety of reasons. For example, the additives to the process can be utilized for, among other purposes, the reduction of nitrates and sulfates. As such, good transport properties of the reactants can be beneficial. This is typically readily achievable in a fluidized bed in which adequate partial pressures of the reducing species as well as good mixing (no channeling) can be attained.

In general, the waste stream components fed to the reactor can be broken down in the presence of the additives through multiple simultaneous processes including pyrolysis, cracking, isomerization, and the like into more manageable forms, for example forms safe for transport or long-term storage, or forms safe for release into the environment. For example, in one embodiment, the reaction products obtained from the process of the invention can include primarily carbonate salts, nitrogen gas, hydrogen gas, and carbon monoxide and/or carbon dioxide.

One embodiment of the present invention includes treating a waste stream in a reformer such as a steam reformer in which the fluidizing medium can include superheated steam. In one particular embodiment, a waste feedstock can be fed to a moderate temperature steam reformer for treatment.

In one preferred embodiment, the feedstock can be indirectly heated in the reactor. As used herein, indirect heating refers to the absence of an open flame or flue gases therefrom contacting the feedstock. Use of indirect heating of the feedstock can promote a reducing environment within the reactor, and prevent undesired in situ partial oxidation or autothermal reactions. For example, the process of the invention can utilize indirectly heated steam reformers such as those disclosed by Mansour. et al. (U.S. Pat. Nos. 5,059,404, 5,397,192, 5,306,481, 5,536,488, and 6,149,765) all of which are incorporated herein in their entirety by reference thereto.

In those embodiments wherein the waste stream is indirectly heated in the reactor, the reactor can be indirectly heated according to other means as well. For instance, the reactor may be heated by electric heaters, pulse combustion heaters, or other suitable heat conduits either internally or externally. In one embodiment, a fluidized bed reactor can be indirectly heated by use of resonance tubes in the bed connected directly to a pulse combustor chamber, as described in U.S. Pat. No. 5,637,192 to Mansour, et al. In another embodiment, the bed can be indirectly heated by electric heater rods immersed in the bed. However, any specific method of indirectly heating the reactor is not critical to the process, since properly shielded and controlled electric heaters could also be used, and may be more economically feasible in certain parts of the world. Another example of a method for indirectly heating a reactor of the present invention includes the utilization of superheated steam or another suitable heat transfer fluid at elevated temperature flowing through heat exchanger conduits throughout the reactor, e.g., immersed in a fluid bed. Optionally, smaller cross-section reactors may be heated indirectly through a containment wall or a surface of the reactor by electrical heaters or other heating methods as are generally known in the art.

In general, in those embodiments wherein the reactor is a fluidized bed reactor, the bed material can be inert and attrition-resistant. One possible bed material is dense alumina spheres or beads. For instance, alumina spheres or beads or grit with a surface-mean diameter between about 70 and about 650 microns and little or no porosity can be used as the bed material. Another example of a suitable bed material is calcium oxide. For example, calcium oxide spheres or beads having a mean diameter of between about 70 and about 650 microns can be utilized as the bed material.

A further example of the bed material can be calcium aluminate based catalyst beads or spheres, which promotes steam reactions having a mean diameter between about 70 to about 650 microns.

In one particular embodiment, dense aluminum oxide bed material can be utilized. Such material can provide bed particles with sufficient hardness (hardness of ~9 while the hardness of diamonds is 10) to attrite the solid products of the process into fines that can be elutriated from the bed and be captured downstream of the reactor, for example in a cyclone, a HEPA filter, or both. This can minimize a buildup of solid products, for example, alkali salts, in the dense fluid bed as well as help to abate bed agglomeration due to eutectics and melting of the solid products. The dense aluminum oxide bed particles can also be beneficial to the process in certain applications because of their inertness at the conditions found in the bed.

The chemical reactions in the reactor, the dynamics of the specific reactor being employed (scale, degree of chugging or slugging, lateral sloshing, internals, etc.) and the design of the waste injection subsystem all play a part in determining the process performance and operating characteristics of the disclosed system. For instance, a fluidizing stream fed to a fluidized bed reactor can be utilized for not only fluidizing the bed, but, in certain process embodiments, can also react with components found in the waste stream to break down the components in accordance with the disclosed process. For example, superheated steam can be supplied to a reactor for fluidizing the bed as well as for reacting with the feed stream.

In one embodiment, a fluidizing stream can include carbon dioxide ($CO_2$), preheated as necessary. $CO_2$ partial pressure can encourage the formation of high melting temperature carbonates, for example alkali metal carbonates, and can decrease the partial pressure of steam, which can discourage the formation of low melting temperature hydroxides in the bed. The formation of low melting temperature hydroxides can render the bed more prone to the formation of agglomerates. As such, incorporation of $CO_2$, for instance as a fluidizing medium, can prevent the formation of agglomerates in the bed and can enhance the disclosed reformation process. This can be particularly useful in embodiments wherein the waste feed contains a significant amount of water that can evaporate in the fluid bed and provide steam. For example, in one embodiment, the fluidizing stream can be essentially free of steam and include primarily preheated $CO_2$. For example, the fluidizing stream can be less than about 5% by volume steam. In another embodiment, the fluidizing stream can be a mixture of superheated steam and $CO_2$.

Other materials can be included in or essentially form the fluidizing stream as well. For example, in one embodiment, the fluidizing stream can include recycle product gas from the system, which can improve thermal and process efficiency. Additionally, gaseous additives to the process, such as gaseous reduction agents, hydrocarbon vapors and the like, can form or be incorporated into the fluidizing stream. Beneficially, fluidizing gases to the reactor bed may be specifically selected based on the waste contents. For example, in certain embodiments, the waste stream feed stock may contain large amounts of water. In other embodiments, however, the waste stream may be essentially moisture free. Appropriate fluidizing stream make-up can thus vary greatly, depending on the waste stream components.

The bed fluidization velocity and the resultant bed dynamics can also help abate the formation of agglomerates in the bed. Additionally, the ratio of the bed material mass inventory to the mass flow rate of injection of waste material, and particularly alkali material, into the bed (solids nominal residence time) can also affect the extent to which the bed can be agglomeration prone for a given fluidization velocity and bed particle size distribution. In general, the longer the nominal solids residence time, the larger the mean and the minimum bed particle size and the higher the fluidization velocity (all within reason), the less prone the bed can be toward agglomeration.

In accordance with the present invention, the presently disclosed waste treatment process includes the addition of one or more carbon-containing additives to the reactor. The carbon-containing additives of the present invention can be gaseous, liquid or solid agents and can vary depending on the make-up of the waste material to be treated in the process as well as on the process conditions to be utilized. For example, the specific carbon-containing additives utilized in the invention can vary depending upon the incoming temperature of the waste stream to be processed, or the desired reaction temperature.

Generally, solid additives can be added directly to the reactor, and liquid additives can be added to the reactor either by incorporating into a liquid waste stream, or separately, as desired. In the particular case of a fluidized bed reactor, gaseous or vaporous additives can be added to the reactor either with or as the fluidizing stream or separately, depending on process conditions.

Figure 1:
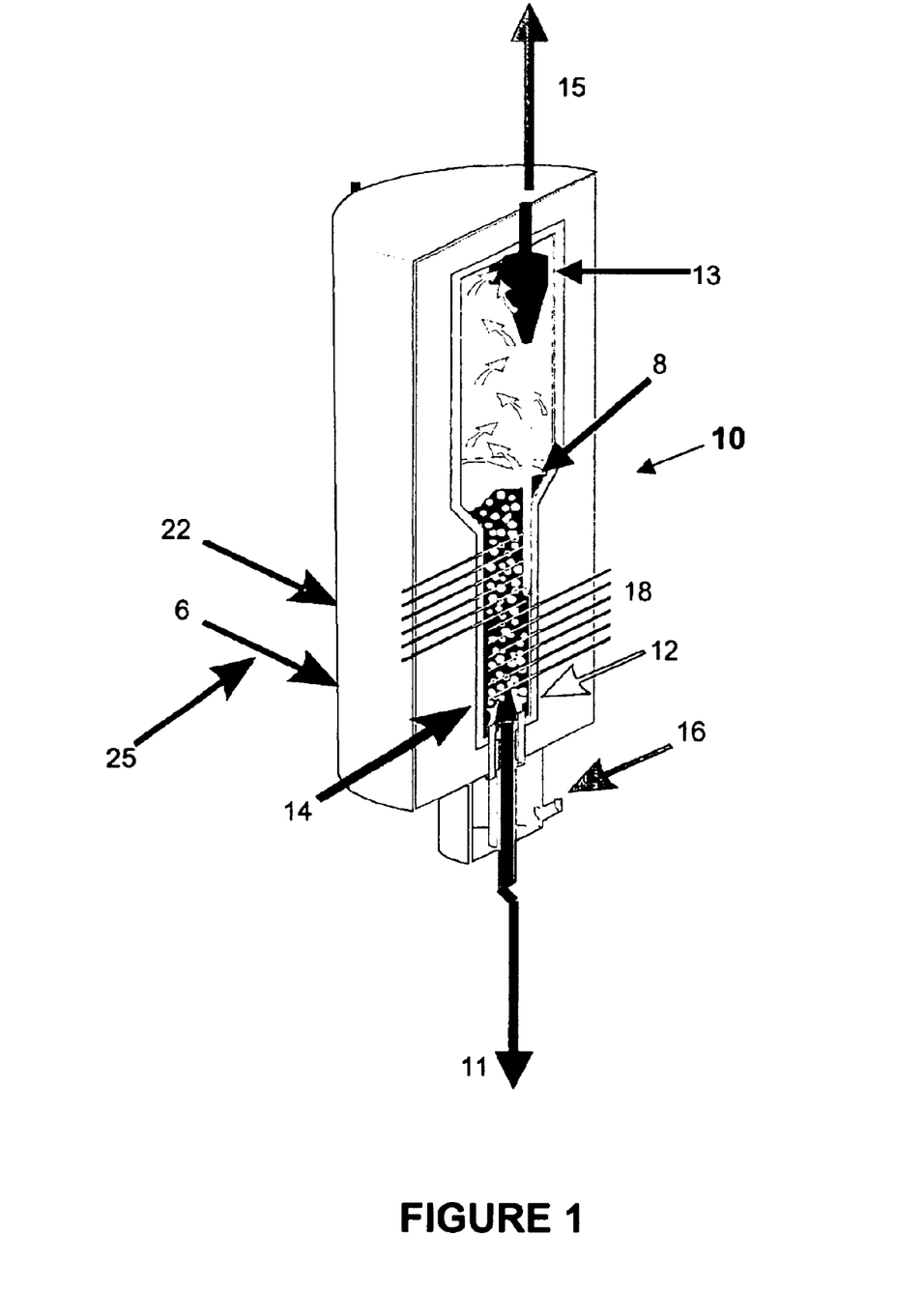
FIG. 1 is a schematic of one embodiment of a reactor suitable for the process of the present invention.

FIG. 1 illustrates one embodiment of a thermochemical reactor 10 suitable for the process of the present invention. As can be seen, the reactor 10 can include heaters 18, and in one particular embodiment, the heaters 18 can be capable of indirectly heating the bed. A waste stream 6 including one or more nitrogen-containing waste products can be fed to the reactor 10 according to any suitable process. For example, in one embodiment, the waste stream 6 can be a liquid waste stream and can be fed to the reactor by utilization of pumps. In an alternative embodiment, the waste stream 6 can be a solid waste stream that can be fed to the reactor 10 by use of an auger feed system. IN one embodiment, the waste stream can be a gaseous stream. In this particular embodiment, the waste stream can be fed to a fluid bed reactor in line with a fluidizing stream. The reactor 10 can also include other components as are generally known in the art, including for instance, bed drain 11, product gas exit 15, and an internal cyclone 13.

According to the embodiment illustrated in FIG. 1, a gas additive stream 12 and/or a vapor additive stream 14 can be added to the bed 8 separate from the fluidizing stream 16. For instance, it may be desirable to utilize this particular arrangement of feed streams in an embodiment in which the fluidizing stream 16 is at a relatively high temperature, such as, for example, greater than about 600° F.

Figure 2:
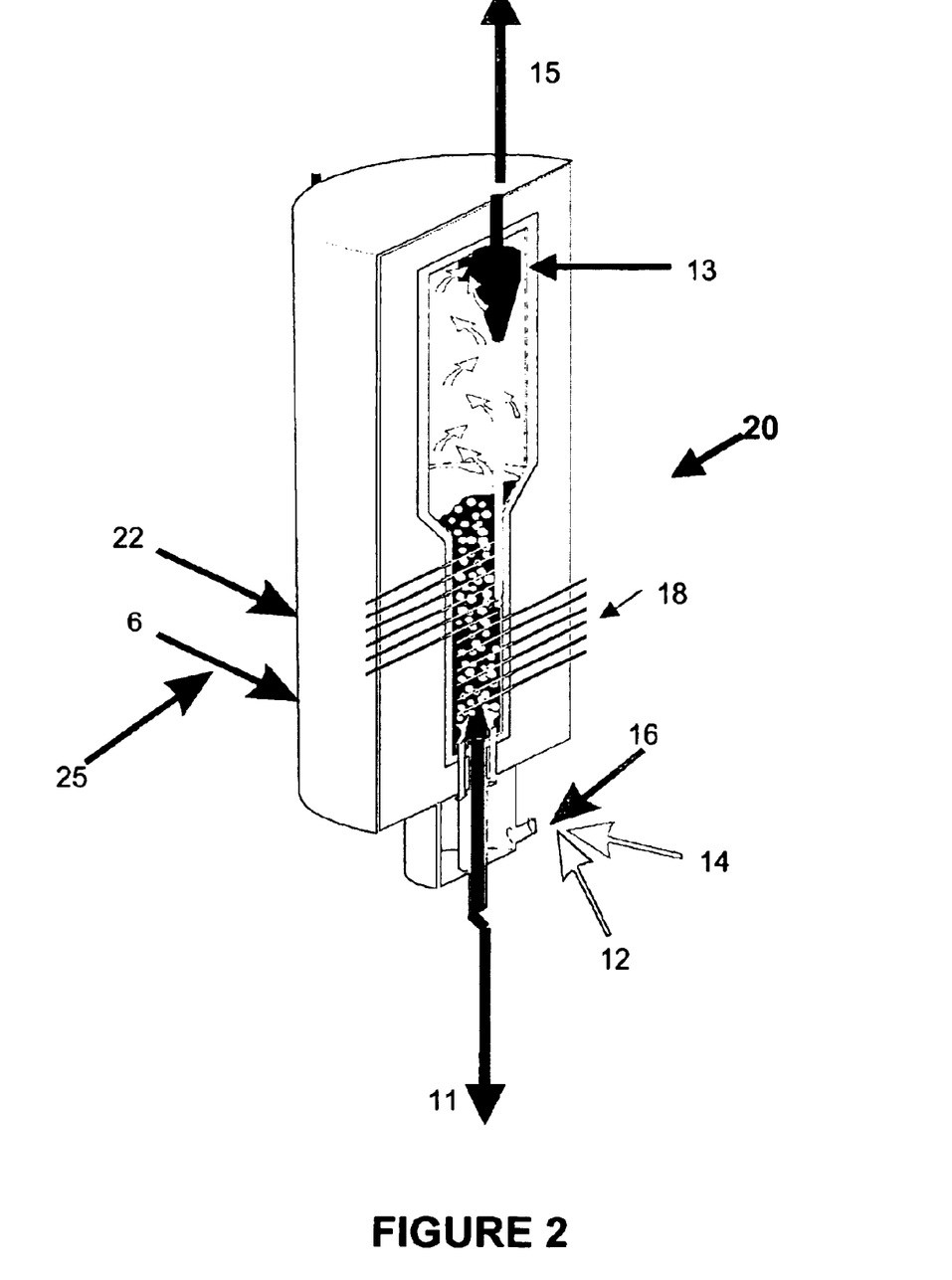
FIG. 2 is a schematic of another embodiment of a reactor suitable for the process of the present invention.

An alternative embodiment of a fluidized bed reactor 20 suitable for the present invention is illustrated in FIG. 2. According to this particular embodiment, the vapor additive stream 14 and the gas additive stream 12 can be added to the reactor 20 in line with the fluidizing stream 16. Such an embodiment may be desired, for example, when the fluidizing stream 16 is at relatively lower temperatures, for instance, when the fluidizing stream 16 is at less than about 600° F.

In one embodiment, the carbon-containing additives of the present invention can be distributed fairly uniformly across a fluidized bed reactor and near the bottom of the bed, in order to maximize contact between the carbon-containing additives and the nitrogen-containing components in the waste stream. For example, a dual distributor arrangement, such as that illustrated in FIG. 1, can be employed.

As shown in the embodiments illustrated in FIGS. 1 and 2, the heater 18 can include heater tubes oriented horizontally as opposed to vertically. In some embodiments, this may provide higher heat transfer coefficient potential. During the process, the heater's surface temperature may be kept within certain limits to avoid tube surface fouling or localized solids melting and agglomeration.

In general, the carbon-containing additives of the present invention can promote the reduction of components in the waste stream at reaction conditions. More specifically, at reaction conditions, the carbon-containing additives of the present invention can decompose and generate one or more carbon-containing radicals that can react with and reduce the nitrogen-containing components of the waste stream. For purposes of this disclosure, a carbon-containing radical is herein defined to include elemental carbon as well as $CH_3$-containing radicals that can promote the reduction of the nitrogen-containing components in the waste stream to form nitrogen gas, carbon monoxide, carbon dioxide, and, in certain embodiments, carbonate salts. While not wishing to be bound by any particular theory, an important step in the disclosed reduction process is believed to be the decomposition of the additive to form carbon-containing radicals, which in turn facilitate the reduction of the nitrogen-containing compounds.

In one embodiment, the carbon-containing additive can be a carbon-containing gas. For example, one or more carbon-containing gases can be added to a fluidized bed reactor to promote the reduction of nitrates and/or nitrites to nitrogen gas. A non-limiting list of possible gaseous reduction promoting additives can include acetylene ($C_2H_2$), ethylene ($C_2H_4$), ethane ($C_2H_6$), and propylene ($C_3H_6$).

The thermal decomposition reactions for the exemplary gaseous additives listed above are as follows:

$$C_2H_2 \rightarrow 2C + H_2$$

$$C_2H_4 \rightarrow 2C + 2H_2$$

$$C_2H_6 \rightarrow 2C + 3H_2$$

$$C_3H_6 \rightarrow 3C + 3H_2$$

Multiple sequential and parallel reaction pathways are present in these particular reduction processes, but, in the specific embodiment wherein sodium nitrate and sodium nitrite are found in the waste stream, the overall reactions can be represented by:

$$2NaNO_3 + 4C \rightarrow Na_2CO_3 + 3CO + N_2$$

$$2NaNO_2 + 2C \rightarrow Na_2CO_3 + CO + N_2$$

Similar reduction processes can be described for other akali-bearing waste. The reduction process can thus generate $N_2$, rather than $NO_x$.

Other carbon-containing additives may be utilized in the disclosed process, in addition or alternatively to those mentioned above to promote the reduction of nitrogen-containing compounds found in the waste stream. For example, other organic reduction promoting agents such as polyethylene, polypropylene, and the like may be added to the fluid bed. In addition, the carbon-containing additives may be added to the bed in any suitable form including gaseous form, as discussed above, liquid form, or solid form, as desired. For example, solid organic material can be added to the reactor such as in the form of small beads, chips, grit, rods or particles and can pyrolyze and crack to generate the reducing agents. For example, according to one particular embodiment of the present invention, polypropylene beads may be injected into the bed to serve as a solid reductant. For instance, polypropylene beads having a nominal diameter of less than about 0.5 inches can be used. In one embodiment, polypropylene beads having a nominal diameter of less than about 0.25 inches can be used.

In one particular embodiment, utilizing a fluidized bed reactor, the reducing environment provided by the carbon-containing additives fed to the reactor can, in addition to reducing the nitrogen-containing compounds in the waste stream, also enhance heat transfer to the bed, providing a "black body" effect. In addition, the carbon-containing additives of the present invention can minimize the potential for particle agglomeration in the bed due to the presence of carbon on the surface of the bed particles, as further discussed herein.

Similar to the reduction pathways discussed above in regard to certain gaseous additives, multiple sequential and parallel reaction pathways are plausible in utilizing a solid carbon-containing additive such as solid polypropylene to promote reduction of nitrates and nitrites. For example, in this particular embodiment, the macro or global reactions when reducing sodium nitrate and sodium nitrite are likely to be:

$$6NaNO_3 + 2C_3H_6 \rightarrow 3Na_2CO_3 + 3N_2 + 6H_2O + 3CO$$

and $$6NaNO_2 + C_3H_6 \rightarrow 3Na_2CO_3 + 3N_2 + 3H_2O.$$

In an alternative embodiment, a hydroxyl or carboxyl-containing additive such as an alcohol or acetic acid ($C_2H_4O_2$) may be utilized. For example, liquid isopropyl alcohol, methanol ($CH_3OH$) or acetic acid may be added directly to the waste when the waste is aqueous, liquid or a slurry. Alternatively, such additives could be injected directly into a fluid bed reactor.

For example, in one embodiment, the carbon-containing additive can be polyvinyl alcohol. According to this particular embodiment, the global nitrate reduction pathway can be illustrated as:

$$2NaNO_3 + C_2H_4O \rightarrow Na_2CO_3 + N_2 + 2H_2O + 2CO$$

The stoichiometry of nitrate reduction with isopropyl alcohol is as follows:

$$2C_3H_8O + 2NaNO_3 + CO_2 \rightarrow Na_2CO_3 + 6CO + N_2 + H_2O + 7H_2$$

As shown, the above equation produces nearly equimolar proportions of carbon monoxide and hydrogen. Most of the carbon monoxide produced by this reaction mechanism may be converted via the water-gas shift reaction and methanation reactions to produce some of the hydrogen and methane.

Another possible reaction mechanism for isopropyl alcohol is as follows:

$$5C_3H_8O + 18NaNO_3 \rightarrow 9Na_2CO_3 + 6CO_2 + 9N_2 + 20H_2O$$

In the above equation, all of the products are fully oxidized. The above equation does not indicate any carbon monoxide, methane or hydrogen being produced. Any excess alcohol fed to the reactor, however, may be reformed or pyrolyzed at the reactor temperature to form other compounds, including carbon monoxide, methane and hydrogen. Examples of other reactions are as follows:

$$C_3H_8O + 2H_2O \rightarrow 3CO + 6H_2$$

$$C_3H_8O \rightarrow 2CH_3{}^* + HCO^* + H^* \rightarrow 2CH_4 + CO$$

and/or $\rightarrow C_2H_6+CO+2H_2$

In still another embodiment, a lactate may be utilized as the carbon-containing additive of the disclosed process. One example of a suitable lactate for the disclosed invention can be isopropyl lactate.

In one embodiment, the reducing environment provided by use of particular additives can also help minimize the potential for particle agglomeration in a fluidized bed reactor. Specifically, utilization of particular carbon-containing additives can promote the formation of carbonate salts, and in particular alkali carbonate salts, which can retard the formation of alkali hydroxides in the bed. Since alkali carbonates have a relatively high melting temperature as compared to the lower melting temperature of alkali hydroxides, specific selection of the carbon-containing additive so as to promote the formation of carbonates can aid in the prevention of agglomeration in the bed.

The disclosed processes can prevent bed agglomeration in fluidized bed reactors by other means as well. For instance, in one embodiment, the process can be designed (via distribution and throughput rate of feed injectors, for example) so as to provide a high rate of drying of liquid carbon-containing additives. This can in turn promote a carbon deposit on the surface of the bed particles having a thin, porous morphology and can promote fast pyrolysis and reduced diffusion limitation on steam/solids heterogeneous reactions. In particular, the higher the pyrolysis rate of the carbon-containing additive, the more carbon can be released in the form of vapors and gases that can contribute to the reducing atmosphere as well as to the alkali carbonate formation of true steam reforming reactions and consequently less organic carbon can be left over in the bed product.

Moreover, the organic carbon that can be left within the thin porous layer on the bed particles can have a large surface area that can promote adequate steam-reforming rates of the organic carbon as well at the moderate bed temperature of certain embodiments of the present invention. As is known, the kinetic rate of reaction per surface area available for reaction with the steam is a function of the bed temperature. A large surface area created by a porous thin layer on the particle can, nevertheless, result in a good rate of carbon conversion via steam reforming.

In addition, by promoting the formation of alkali carbonate salts in the process, a matrix of alkali carbonates can be included within the thin porous layer on the bed particles and can act as a steam promoter (like a catalyst) for a steam-reforming reaction. Having a thin porous layer of alkali carbonates on the surface of the bed particles can also be useful in creating an opportunity for the attrition and elutriation of the alkali carbonate laden material from the bed. This can have at least two desirable effects. The first is that the product buildup in the bed may be reduced. The second is amelioration of the agglomerate formation potential without reliance on the presence of excessive carbon in the bed.

According to one embodiment of the present invention, the waste stream can also include sulfur-containing compounds, and in particular, sulfates, in addition to the nitrogen-containing compounds. The presence of sulfates in either the solid residue reaction products from the bed or in the waste stream itself can be detrimental to vitrification and therefore, certain embodiments of the present invention can promote the decomposition and reduction of sulfates. For example, sodium and potassium sulfates can form eutectics with chlorides and promote bed agglomeration. To that end, in certain embodiments of the invention a carbon monoxide (CO) rich environment can be established in the bed to aid the reduction of sulfates and minimize the potential for bed agglomeration.

Generally, CO can facilitate the reduction of sulfates such as sodium sulfate, for example, according to the following:

$$Na_2SO_4+CO \rightarrow Na_2CO_3+SO_2$$

A CO-rich environment can be promoted in the bed through a variety of methods. For example, the nitrate an/or nitrite reduction itself can generate CO. However, in certain embodiments, it may be desirous to add or otherwise generate an increased amount of CO in the bed.

For example, in one embodiment, additional CO may be generated in a unit operation external to the fluid bed or within the bed, as desired. CO could also be directly supplied to the bed from pressurized tanks, depending on the process conditions and the economics. In any case, CO can generally be introduced into the reactor bed either together with the fluidizing stream (if the stream is $CO_2$) or separately (if the fluidizing medium contains steam). In one embodiment, the added CO can be distributed fairly uniformly across and near the bottom of the fluidizing bed.

In one embodiment, a carbon-containing additive can be included in the process that can generate CO upon decomposition at reactor conditions in order to promote reduction of sulfates in the waste stream. For instance, hydroxyl and/or carboxyl containing additives can generate CO in the bed for the reduction of sulfates. For example, decomposition of methanol and acetic acid can readily generate CO in the bed according to the following reactions:

$$CH_3OH \rightarrow CO+2H_2$$

$$C_2H_4O_2 \rightarrow 2CO+2H_2$$

In another process embodiment, a longer chain alcohol or carboxylic acid can be added to the process to generate CO in the bed. Examples of other suitable hydroxyl-containing additives include $C_1$ to $C_{10}$ alcohols, such as isopropyl alcohol and ethyl alcohol. Other possible additives include diacetone alcohol and polyvinyl alcohol. For example, polyvinyl alcohol can decompose to generate CO in the bed according to the following reaction:

$$(CH_2{:}CHOH)_n \rightarrow CO, CH, H_2$$

According to some embodiments, a carbon-containing additive such as, for example, polyvinyl alcohol can be utilized that can decompose to produce the carbon-containing radical for the reduction of the nitrogen-containing compounds as well as to produce CO for the reduction of sulfates.

Polyvinyl alcohol may be added to the reactor as a solution. For instance, as a solution including from about 5% by weight to about 50% by weight polyvinyl alcohol, and in one embodiment from about 5% by weight to about 15% by weight. The polyvinyl alcohol may be blended with the waste at a mass ratio of from about 0.5:1 to about 1.5:1, such as at a mass ratio of 1:1.

In general, the amount of carbon-containing additive provided to the reactor can be at least the stoichiometric amount necessary to completely reduce the nitrogen-containing components (and optionally any sulfates) of the waste stream. Any particular amount will, obviously, depend upon the specific make-up of the waste stream to be treated. Practically, it may be desired in some embodiments to provide an excess amount of the additive, however, to ensure more complete reduction of the waste materials. For example, in one embodiment, between about 1 and about 3 times the stoichiometric amount of carbon-containing additive can be utilized so as to ensure more complete reduction of the nitrogen-containing compounds of the waste stream while recognizing economic realties of the process. Where cost is not of primary concern, however, higher amounts of additives may obviously be used.

In general, the reactor temperature can vary depending upon particular process considerations. For example, at operating conditions, when utilizing a thermochemical fluidized bed reactor, the temperature can generally range between about 600° F. and about 1,800° F. In one particular embodiment, the bed temperature can be less than about 1,400° F. so as to prevent bed agglomeration due to melting of solid reaction products, in particular carbonate salt products. For example, in one embodiment, the bed temperature can be between about 900° F. and about 1,400° F., depending on the constituents of the waste and particular additives. In one embodiment, a fluid bed can be operated at relatively moderate temperature (e.g., about 900° F. to about 1,350° F.). In this particular embodiment, bed agglomeration potential can typically be negligible.

In addition, as the carbon-containing radicals will generally be produced at the reactor conditions, the carbon-containing additive can vary depending upon expected reactor temperature and vice-versa. For example, it may be desired to choose a particular carbon-containing additive based upon desired reactor temperature or alternatively adjust reactor temperature somewhat to encourage decomposition of a particular carbon-containing additive.

While not a requirement of the process, in one embodiment of the present invention, the reactor can be operated at below atmospheric pressure or negative gage pressure. This can minimize the potential for harmful substance leakage into the ambient and can enhance occupational health and safety attributes of the system. In particular, in those embodiments wherein the waste stream includes hazardous materials, and in particular radioactive materials, it may be preferred to operate a fluidized bed reactor at below atmospheric or negative gage pressure.

According to one embodiment of the present invention, the waste stream to be treated according to the disclosed process can include one or more nitrogen oxides (commonly referred to as $NO_x$, e.g., $NO$, $NO_2$, and $N_2O_3$). For instance, the waste stream including $NO_x$ can be an off-gas stream from a process that forms $NO_x$ as a by-product. For example, the waste stream can be an off-gas from a combustion process or a gasification process. In another embodiment, the $NO_x$ can be formed in a steam reformation process. According to this embodiment, the carbon-containing additive of the present invention can be decomposed as described herein to form carbon-containing radicals that can react with and reduce the $NO_x$ to form a product stream including nitrogen gas as well as carbon monoxide and/or carbon dioxide.

In one particular embodiment, wherein the waste stream to be treated is a gaseous stream containing $NO_x$, the waste stream can be contacted with the carbon-containing additives of the present invention at a pre-determined temperature. In particular, the process can be designed so as to ensure that the temperature of contact is at or near the preferred temperature for efficiently decomposing the carbon-containing additives to the carbon-containing radical reductants for reaction with the $NO_x$. For example, in certain combustion processes, the off-gases can be extremely hot, for instance in excess of about 2,000° F. In this embodiment, it may be desirable to cool the gaseous stream, for example to a temperature between about 600° F. and about 2,000° F., prior to mixing the waste stream with the carbon-containing additives of the present invention. In other embodiments, a cooling process may not be necessary, for example in those embodiments wherein the waste stream is provided directly from the $NO_x$ producing process at a suitable temperature for contact with the particular carbon-containing additive of the invention.

Figure 3:
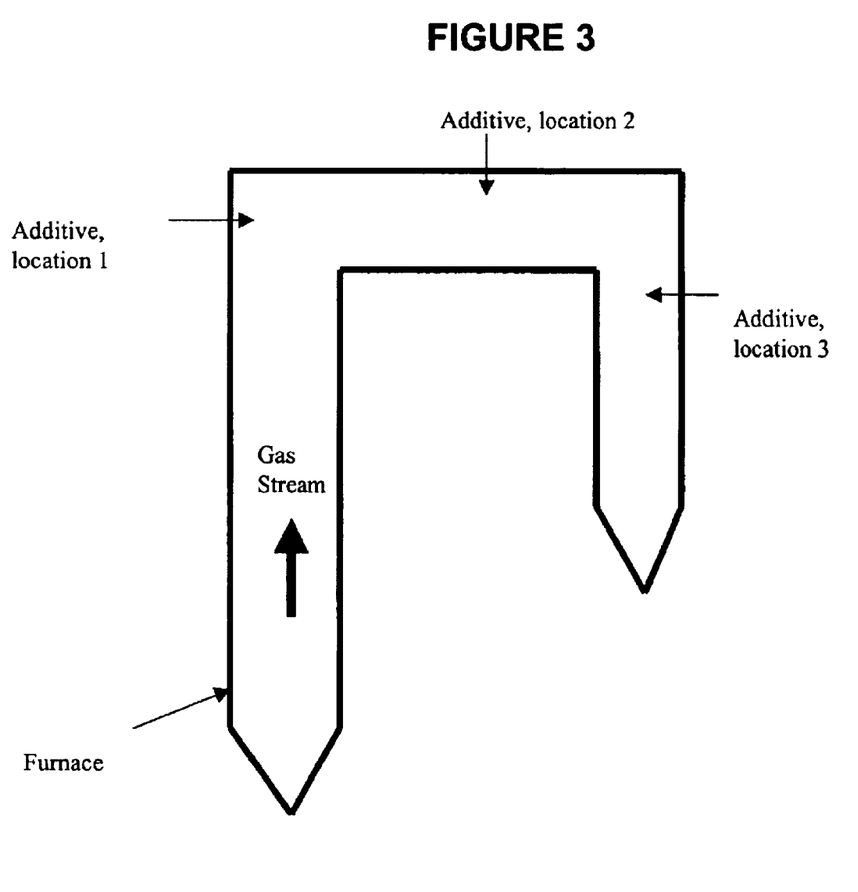
FIG. 3 is a schematic of an embodiment of the process of the present invention.
Figure 4:
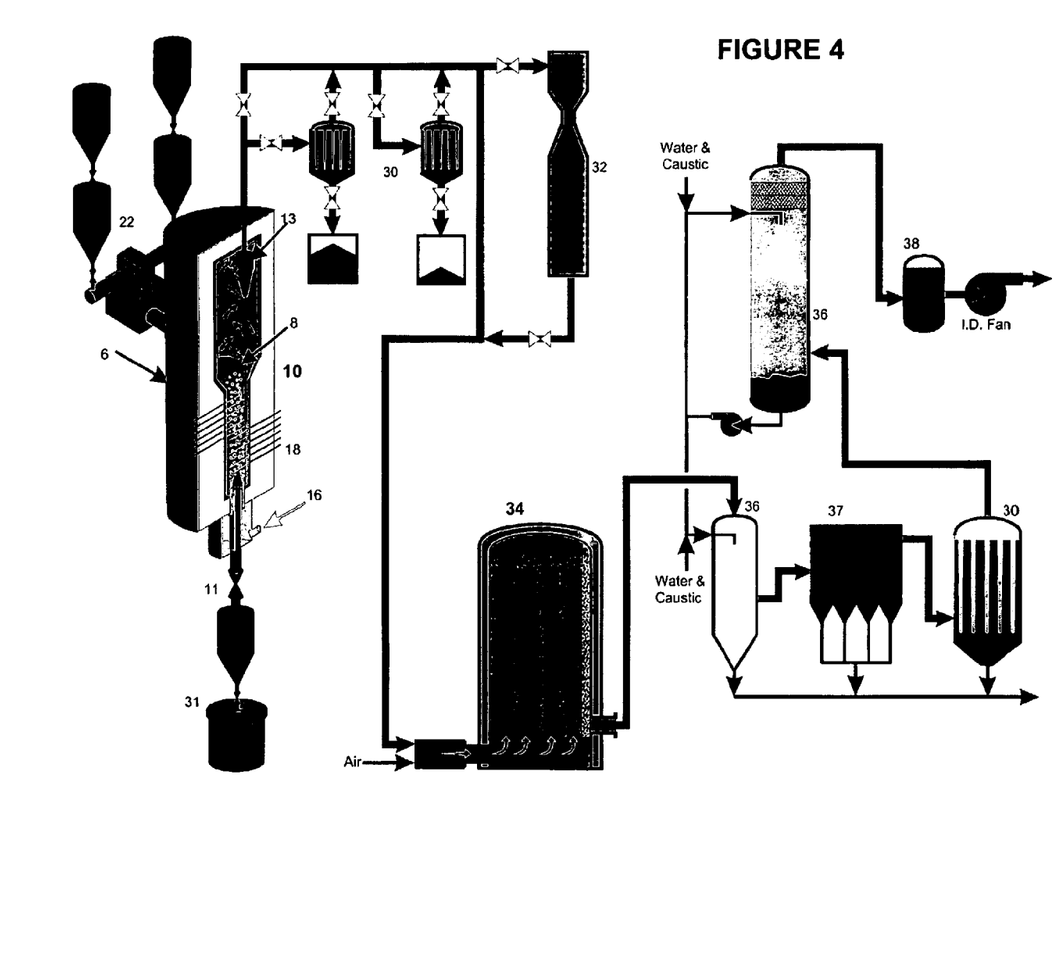
FIG. 4 is a flow diagram of one embodiment of the process of the present invention.

For instance, one embodiment of the disclosed process is schematically illustrated in FIG. 3. According to this particular embodiment, the process can be utilized for treatment of a gaseous stream, for example a flue gas stream coming off of a furnace that can include $NO_x$ compounds. As can be seen, the additive can be mixed with the gaseous stream at various possible locations after the gaseous stream exits the furnace. Selection of location can depend upon, among other parameters, the specific carbon-containing additive to be utilized in the process as well as the temperature and/or oxygen content of the flue gas at the specific additive location.

In addition to the carbon-containing additives of the present invention, additives as are generally known in the art may optionally be included in the presently disclosed waste treatment processes. For example, additional reduction promoting agents, catalysts, stabilizers, agglomeration preventatives, and the like can additionally be utilized in the disclosed process.

For example, one embodiment of the present invention is directed to treatment of a waste stream that includes radioactive materials. Certain compounds of radionuclides that may be found in the waste stream are more volatile than others. For instance, cesium chloride (CsCl) and cesium fluoride (CsF) are more stable than cesium nitrate ($CsNO_3$) and cesium carbonate ($Cs_2CO_3$) while technetium oxide is much more stable than technetium chloride ($TcCl_6$) and technetium fluoride ($TcF_6$). As such, depending on the makeup of the waste stream, it may be beneficial to add a stabilizing agent either directly to the waste stream before introduction to the reactor or alternatively directly into the reactor. For example, tetrachloroethylene ($C_2Cl_4$), tetrachloroethane ($C_2H_2Cl_4$), trichloroethylene ($C_2HCl_3$), trichloroethane ($C_2H_3Cl_3$), chloroform ($CHCl_3$), dichloroethane ($C_2H_4Cl_2$), propylene chloride ($C_3H_6Cl_2$), ethyl chloride ($C_2H_5Cl$), or acetylene dichloride ($C_2H_2Cl_2$) could be added to an aqueous waste stream prior to introduction into a fluidized bed reactor or directly and separately injected into the fluid bed. Alternately, methyl chloride ($CH_3Cl$) may be injected into a fluidized bed reactor to stabilize cesium, if desired. In another embodiment, polyvinyl chloride can be added to a fluidized bed to provide a stabilizer. For example, solid polyvinyl chloride in the form of small beads, chips, rods, or other shapes could be added to a fluidized bed reactor.

Another example of a "stabilizing agent" can be a gas, for example, $CO_2$, which can be reacted with or bubbled through the waste before introduction to a fluid bed if the waste is a liquid or slurry and the waste contains a significant proportion of alkali hydroxide. This can facilitate the conversion of the low melting point hydroxide to higher melting temperature alkali carbonate.

In another embodiment, the alkali chloride and/or sulfate and/or hydroxide concentration in the waste feed can be relatively high. In this case, it may be beneficial to include in the process an additive that can prevent bed agglomeration. For example, kaolin clay, diatomaceous earth or another aluminosilicate and/or magnesium oxide or calcium oxide can be added at a rate commensurate with the alkali chloride and/or sulfate and/or hydroxide feed rate to promote the formation of higher melting point compounds such as aluminum-alkali-silicates and thereby substantially eliminate fluid bed agglomeration tendency. Additionally, these compounds are likely to be more stable and non-leachable and in turn allow ease of storage and/or disposal. If such compounds tend to accumulate in the bed, the process operating conditions such as fluidization velocity and bed material properties (type, size distribution, shape, etc.) can be selected to attrite the compounds at a suitable rate and elutriate them from the bed. Alternately, one or more attrition jets may be used for particle size management.

Other exemplary additives for furthering the objectives of the process may include other organic and carbonaceous material such as lignin, lignite, plastics, etc.

FIG. 3 illustrates one possible embodiment of a flow diagram for a system suitable for use in the present invention. In general, as the waste stream 6 enters the reactor 10, any water and other liquid components such as nitric acid can rapidly vaporize. Heaters 18 can provide indirect heat to heat the bed 8. Non-volatile components can coat the particles forming the bed 8, where they can dry and denitrate and form friable carbonate salts, most of which can subsequently abrade or spall off of the bed particles. The product fines can form an ash-like powder that can be elutriated from the fluidized bed and collected in an internal cyclone 13 or filter vessels 31 or both. Organic process additives can be added as a solid via an auger feed system 22 and can volatilize, crack and pyrolyze in the bed, producing vapors and gaseous pyrolysis products as well as solid-phase char. The vapors and gaseous pyrolysis products can be further cracked by high-temperature steam and/or $CO_2$ in the fluidizing stream 16 and can be partially reformed to produce lower molecular weight hydrocarbons, hydrogen, carbon monoxide, and aromatic compounds. The char retained in the bed can be reformed to form carbon monoxide and/or hydrogen. Dissolved inorganic solids in the waste stream 6 can be largely converted to carbonate and aluminate salts.

The system can optionally incorporate different unit operations as are generally known in the art for separating entrained products and elutriated carbon fines from the off-gases. For example, in the embodiment illustrated in FIG. 3, the system can include fine particle filtration steps, such as cyclones 13 (either internal or external to the reformer), filters, (including, for example, HEPA filters 30, activated carbon filters 38, etc.), scrubbers 36, oxidation processes 34, baghouses 37 and the like for separating contaminants and reaction products from the stream. In one embodiment, the process can include a second stage reactor, such as, for example, a steam reformer 32.

In addition, the system can optionally include specific unit operations for removal of particular contaminants such as metals and radionuclides from the waste stream. For example, contaminants such as mercury, cadmium, chromium, lead, and the like may be removed according to the process. In one embodiment, vapor traps for removing certain vapors from the waste stream, for example a mercury and/or a lead vapor trap could be included in the system. In one embodiment, the system can include mercury and/or lead vapor traps following a low temperature HEPA filtration. In this embodiment, the flow temperature of the gas stream leaving the spray cooler/dry scrubber can be high enough so as to prevent condensation of vapors in the filtration step.

The disclosed process can be inherently safer than many previously known processes due, for instance, to the absence of oxidizing or strongly exothermic reactions. For example, the reactor temperature in a fluidized bed reactor system can remain substantially uniform during the process as a result of the endothermic reactions performed in the bed using indirect heating and therefore creating no partial oxidation. Additionally, the system can be designed so that in the case of an interruption in feed or additive flow, which can cause the bed and heater temperatures to increase, the control system can decrease the power input to the heater, and maintain the bed temperature at a setpoint. Thus, the architecture of the system can provide for a converging solution and avoid system divergence and in turn catastrophic failure during operation.

In one embodiment, it may be desirable to use a true indirectly heated steam reformer with a highly reducing atmosphere during the process. In particular, injection of oxygen may escalate into a partial oxidation gasification process and can require a higher feed rate of the carbon-containing additive in order to achieve the desired reduction of the nitrogen-containing compounds in the waste stream. A true steam-reforming process with no oxygen injection may be desired in some applications for the reduction of reactants as well as for promoting formation of alkali carbonates from alkalis in the waste stream, as previously discussed.

A true indirectly heated steam-reforming process offers the opportunity for keeping the mass flow of material in the reaction zone to affect the reaction with a highly reducing atmosphere and alkali carbonate production for stabilization of the alkali. This can be without the addition of oxygen for keeping the bed hot, and, in one embodiment, can be without the use of more steam than what is already being generated from the water in the feed.

In this regard, the use of $CO_2$ for fluidization in place of steam may be preferred in some embodiments. In particular, in those embodiments in which the waste stream is aqueous it may be preferred to have the fluidization stream substantially free of steam. For example, $CO_2$ in the reactor environment can become a source of carbon to promote alkali carbonate formation and to form gas phase reductant, i.e. CO, via an intermediate reaction with the carbon in the reductant. This could be beneficial to the process through reduction in the amount of carbon-containing additive required for delivery to the reaction zone as well as serving to fluidize the bed and providing a gas phase carbon-containing additive that would not remain in the bed.

A strict limitation on oxygen is not a requirement of the present invention, however, and in other embodiments, the presently disclosed process can be carried out in an atmosphere including oxygen. As the feed rate of the carbon-containing additive will necessarily be increased in an oxygen-containing environment, however, it may be preferable in some embodiments to limit the total amount of oxygen in the reactor. For example, in one embodiment, the total oxygen content in the reactor can be less than about 5% by volume.

It will be appreciated that the foregoing examples, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention that is defined in the following claims and all equivalents thereto. Further, it is recognized that many embodiments may be conceived that do not achieve all of the advantages of some embodiments, yet the absence of a particular advantage shall not be construed to necessarily mean that such an embodiment is outside the scope of the present invention.

What is claimed:

1. A waste stream treatment method comprising:

feeding a waste stream comprising nitrates, nitrites, or mixtures thereof to a reactor, wherein the reactor is a fluidized bed reactor fluidized with carbon dioxide;

heating the reactor to a reaction temperature;

feeding a carbon-containing additive to the reactor;

decomposing the carbon-containing additive to form a carbon-containing radical; and reducing the nitrites, nitrates, or mixtures thereof via reaction with the carbon-containing radical to a product stream, wherein the product stream comprises nitrogen gas, carbonate salts, and at least one of carbon monoxide and carbon dioxide.

2. The method of claim 1, wherein the nitrates, nitrites, or mixtures thereof are metal nitrates, metal nitrites, or mixtures thereof.

3. The method of claim 1, wherein the reaction temperature is less than about 1,400° F.

4. The method of claim 3, wherein the carbon-containing additive is isopropyl alcohol.

5. The method of claim 3, wherein the carbon-containing additive is polypropylene.

6. The method of claim 1, wherein the reactor is indirectly heated.

7. The method of claim 1, wherein the waste stream comprises radioactive materials.

8. The method of claim 7, wherein the reactor is operated at negative gauge pressure.

9. The method of claim 1, wherein the waste stream further comprises sulfur-containing compounds, the method further comprising reduction of the sulfur-containing compounds.

10. A waste stream treatment method comprising:

providing a waste stream comprising alkali metal nitrates, alkali metal nitrites, or combinations thereof to a fluidized bed reactor wherein the bed is fluidized by means of a fluidizing stream;

indirectly heating the reactor to a reaction temperature;

providing a carbon-containing additive to the reactor, wherein the carbon-containing additive decomposes at the reaction temperature to form a carbon-containing radical; and reforming the waste stream in the reactor in the presence of the additive, wherein the alkali metal compounds are reduced to form alkali metal carbonate salts, nitrogen gas, and one or both of carbon monoxide and carbon dioxide.

11. The method of claim 10, wherein the alkali metal is sodium or potassium.

12. The method of claim 10, wherein the carbon-containing additive is isopropyl alcohol.

13. The method as claim 12, wherein the additive is provided to the reactor in line with the waste stream.

14. The method of claim 10, wherein the carbon-containing additive is polypropylene.

15. The method of claim 10, wherein the reaction temperature is less than about 1,400° F.

16. The method of claim 10, wherein the waste stream is an aqueous waste stream and the fluidizing stream comprises carbon dioxide.

17. The method of claim 16, wherein the fluidizing stream contains essentially no steam.

18. The method of claim 10, wherein the waste stream comprises radioactive material.

19. The method of claim 10, wherein the additive is a gas.

20. The method of claim 19, wherein the additive is provided to the reactor in line with the fluidizing stream.

21. A waste or gaseous stream treatment method comprising providing a waste or gaseous stream comprising one or more nitrogen oxide compounds; indirectly heating the waste or gaseous stream to a reaction temperature;

injecting and decomposing a carbon-containing compound to form a carbon-containing radical;

contacting the waste stream with the carbon-containing radical; and reducing the one or more nitrogen oxide compounds via reaction with the carbon-containing radical at the reaction temperature to form a product stream, the product stream comprising nitrogen gas at least one of carbon monoxide and carbon dioxide.

22. The method of claim 21, wherein the waste stream comprises a nitrogen oxide compound that is the product of a combustion process.

23. The method of claim 21, wherein the waste stream comprises a nitrogen oxide compound that is the product of a gasification process.

24. The method of claim 21, wherein the waste stream is contacted with the carbon-containing radical in a reformation process.

25. The method of claim 21, wherein the waste stream and the carbon-containing radical are contacted at a temperature of between about 600° F. and about 2,000° F.

26. The method of claim 21 wherein the nitrogen oxide compounds are reduced in an atmosphere comprising less than about 5% oxygen by volume.

* * * * *